(12) United States Patent
Bugosh

(10) Patent No.: US 6,378,646 B1
(45) Date of Patent: Apr. 30, 2002

(54) PIVOTAL BALLNUT CONNECTION FOR A POWER ASSISTED STEERING SYSTEM

(75) Inventor: Mark J. Bugosh, Sterling Heights, MI (US)

(73) Assignee: TRW Inc., Lyndhurst, OH (US)

( * ) Notice: Subject to any disclaimer, the term of this patent is extended or adjusted under 35 U.S.C. 154(b) by 0 days.

(21) Appl. No.: 09/644,115

(22) Filed: Aug. 22, 2000

(51) Int. Cl.⁷ ................................................ B62D 5/04
(52) U.S. Cl. ........................ 180/444; 74/424.82; 74/499
(58) Field of Search ................................. 180/443, 446, 180/444; 74/424.82, 424.83, 424.84, 424.85, 424.86, 424.87, 499

(56) References Cited

U.S. PATENT DOCUMENTS

| | | | |
|---|---|---|---|
| 4,557,156 A | * 12/1985 | Teramachi | ............... 74/424.86 |
| RE32,222 E | 8/1986 | Drutchas | |
| 4,666,014 A | 5/1987 | Carlson et al. | |
| 4,694,925 A | * 9/1987 | Roberts | ....................... 180/444 |
| 4,773,497 A | 9/1988 | Carlson et al. | |
| 4,811,813 A | 3/1989 | Hovanchak | |
| 4,887,682 A | 12/1989 | Drutchas et al. | |
| 5,975,234 A | 11/1999 | Bugosh et al. | |
| 5,998,311 A | * 12/1999 | Nels | ........................ 188/251 A |
| 6,123,167 A | * 9/2000 | Miller et al. | ................. 180/443 |
| 6,144,137 A | * 11/2000 | Engelbert | .................... 310/258 |

* cited by examiner

Primary Examiner—Kevin Hurley
(74) Attorney, Agent, or Firm—Tarolli, Sundheim, Covell, Tummino & Szabo L.L.P.

(57) ABSTRACT

The present invention is directed to a power assisted steering system (10). The power assisted steering system (10) comprises a rotatable member (34) capable of rotating about an axis. The system further comprises a ballnut (66) that is coaxial with the rotatable member (34). The ballnut (66) has a threaded cylindrical inner surface (76) and a plurality of drive balls (78). The system (10) further comprises a steering member (24). The steering member (24) is coaxial with the rotatable member (34) and the ballnut (66). The steering member (24) has a threaded portion (32). The steering member (24) extends through the inner surface (72) of the ballnut (66) such that the drive balls (78) of the ballnut (66) engage the threaded portion (32) of the steering member (24). The ballnut (66) is rotatably driven by the rotatable member (34) about the axis and is pivotal relative to the rotatable member (34) in a direction transverse to the axis.

18 Claims, 4 Drawing Sheets

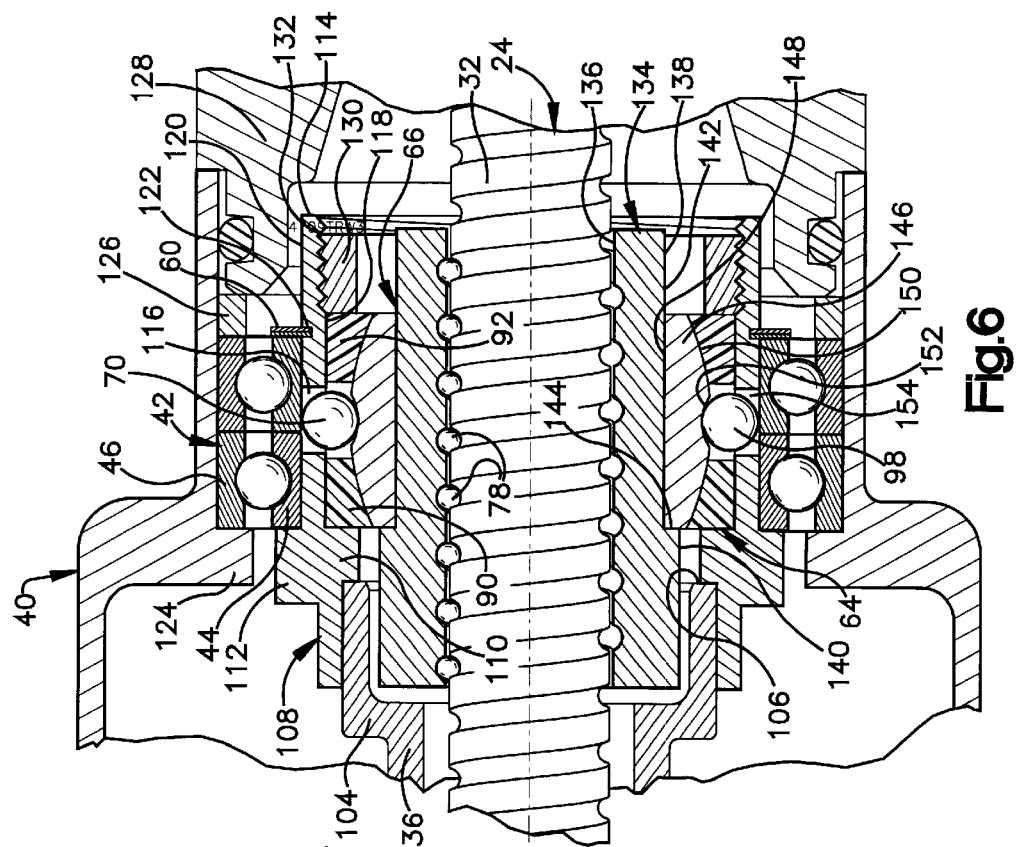

PIVOTAL BALLNUT CONNECTION FOR A POWER ASSISTED STEERING SYSTEM

TECHNICAL FIELD

The present invention relates to a system for moving a movable members and more particularly to an improved ballnut mounting arrangement in a power assisted steering system.

BACKGROUND OF THE INVENTION

Power assisted steering systems assist a vehicle driver in turning the steerable wheels of a vehicle. In a rack and pinion steering system, the driver applies rotary force to a steering wheel of the vehicle and this rotary force is transferred through the steering input shaft to a pinion that interacts with a rack to cause the steerable wheels to turn. A power assisted steering system assists the driver by either applying a rotary force to the steering input shaft to assist in driving the pinion or by applying a linear force directly to the rack.

When applying a linear force directly to the rack, a power assisted steering system generally uses a hydraulic or an electric motor. When an electric motor is used, the electric motor may be connected to a ballnut assembly that converts the rotary force of the electric motor into a linear force to move the rack. The electric motor drives a ballnut assembly that encircles a threaded portion of a steering member. When the electric motor is energized, the rotary motion of the motor rotates the ballnut about the steering member causing the steering member to move linearly.

The ballnut may be mounted within the cylindrical motor shaft of the electric motor. It is common to fix the ballnut both radially and axially relative to the motor shaft of the electric motor. When the ballnut is both radially and axially fixed, assembly of the power assisted steering system requires close manufacturing tolerances to insure proper alignment of parts. Additionally, during use, the environmental factors acting upon the steering member of the power assisted steering system vary continuously. Examples of such environmental factors are road conditions, vehicle load, vehicle speed, steering rate, temperature, and steering direction. As a result of these factors, the steering member may bend slightly and may apply varying axial and radial forces against the ballnut. These forces may cause increased friction between the ballnut and the steering member resulting in noise and in loss of efficiency of the power assisted steering system.

SUMMARY OF THE INVENTION

The present invention is directed to a system which includes a rotatable member capable of rotating about an axis. The system includes a ballnut coaxial with the rotatable member. The ballnut has a threaded cylindrical inner surface and a plurality of drive balls. A movable member is coaxial with the rotatable member and the ballnut. The movable member has a threaded portion. The movable member extends through the inner surface of the ballnut such that the drive balls of the ballnut engage the threaded portion of the movable member. The ballnut is rotatably driven about the axis by the rotatable member and is pivotal relative to the rotatable member in a direction transverse to the axis.

In one embodiment of the invention, the ballnut is pivotal upon two pivot balls, located on opposite sides of the axis. Each pivot ball is located in a recess formed in the outer surface of the ballnut and in an opening formed in the rotatable member.

BRIEF DESCRIPTION OF THE DRAWINGS

The foregoing and other features of the present invention will become apparent to those skilled in the art to which the present invention relates upon reading the following description with reference to the accompanying drawings, in which:

FIG. 5 is a view of a third embodiment of the invention;

FIG. 6 is a view of a fourth embodiment of the invention.

DETAILED DESCRIPTION OF THE INVENTION

Figure 1:
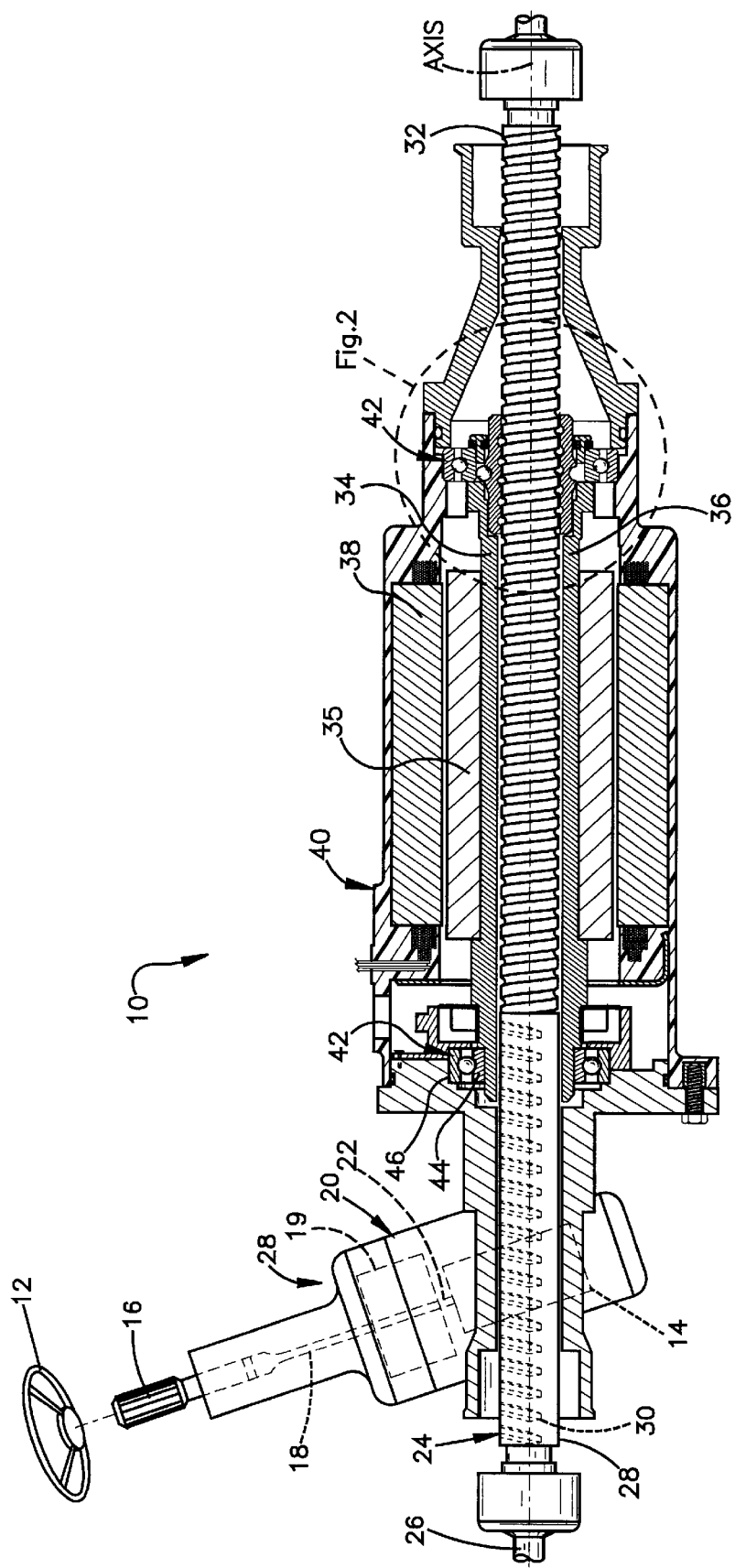
FIG. 1 is a schematic view of the power assisted steering system of the present invention.

FIG. 1 illustrates an electric power assisted steering system 10. The steering system 10 includes a steering wheel 12 that is rotatable by a vehicle driver. The steering wheel 12 is connected to a pinion gear 14 through an input shaft 16. The input shaft 16 includes a torsion bar 18 that is interposed between the steering wheel 12 and the pinion gear 14. When the vehicle driver rotates the steering wheel 12 of the vehicle, a rotary force is transferred through the input shaft 16 to the pinion gear 14. If the resistance to rotation of the pinion gear 14 is low, the pinion gear 14 will be manually rotated as a result of the rotation of the steering wheel 12 and will affect a turning of the steerable wheels (not shown) of the vehicle. However, if sufficient resistance to rotation of the pinion gear 14 exists, the torsion bar 18 will deflect, i.e. twist. A sensor 19 monitors the direction and amount of deflection of the torsion bar 18 and controls the power assisted steering system 10 accordingly.

The pinion gear 14 is located within a pinion housing 20 on an end 22 of the input shaft 16 opposite the steering wheel 12. A plurality of helically cut teeth extends around an outer surface of the pinion gear 14.

The power assisted steering system 10 further includes a steering member 24. The steering member 24 is coupled with the steerable wheels of the vehicle through tie rods 26. The steering member 24 has a cylindrical outer surface 28 whose center defines an axis. The outer surface 28 of the steering member 24 includes a portion having rack teeth 30 and a threaded portion 32. The portion of the steering member having rack teeth 30 extends through the pinion housing 20 and is engaged by the pinion gear teeth. The threaded portion 32 of the steering member 24 is located axially adjacent the rack teeth portion 30.

A rotatable member 34 is radially spaced from the steering member 24. The rotatable member 34 is capable of rotating about the axis formed by the center of the steering member 24. The rotatable member 34 surrounds a portion of the steering member 24 and rotates relative the steering member 24.

The rotatable member 34 shown in FIG. 1 is a motor shaft 36 extending from the rotor of an electric motor 38. The rotor of the electric motor 38 includes a plurality of magnetic plates 35 and is caused to rotate by a stator in a known manner.

The electric motor 38 is enclosed in a housing 40 that connects to the pinion gear housing 20 on one end and extends axially in a direction opposite the pinion gear housing 20 to enclose a portion of the threaded portion 32 of the steering member 24. The motor shaft 36 is rotatable relative to the housing 40 on a plurality of rotary bearings 42.

The motor shaft 36 extends in an axial direction away from the electric motor 38. The motor shaft 36 is supported on both sides of the electric motor 38 by the rotary bearings 42. On the side of the electric motor 38 nearest the pinion gear 14, an inner race 44 of a rotary bearing 42 is attached to the motor shaft 36 and an outer race 46 of the rotary bearing 42 is attached to the housing 40.

Figure 2:
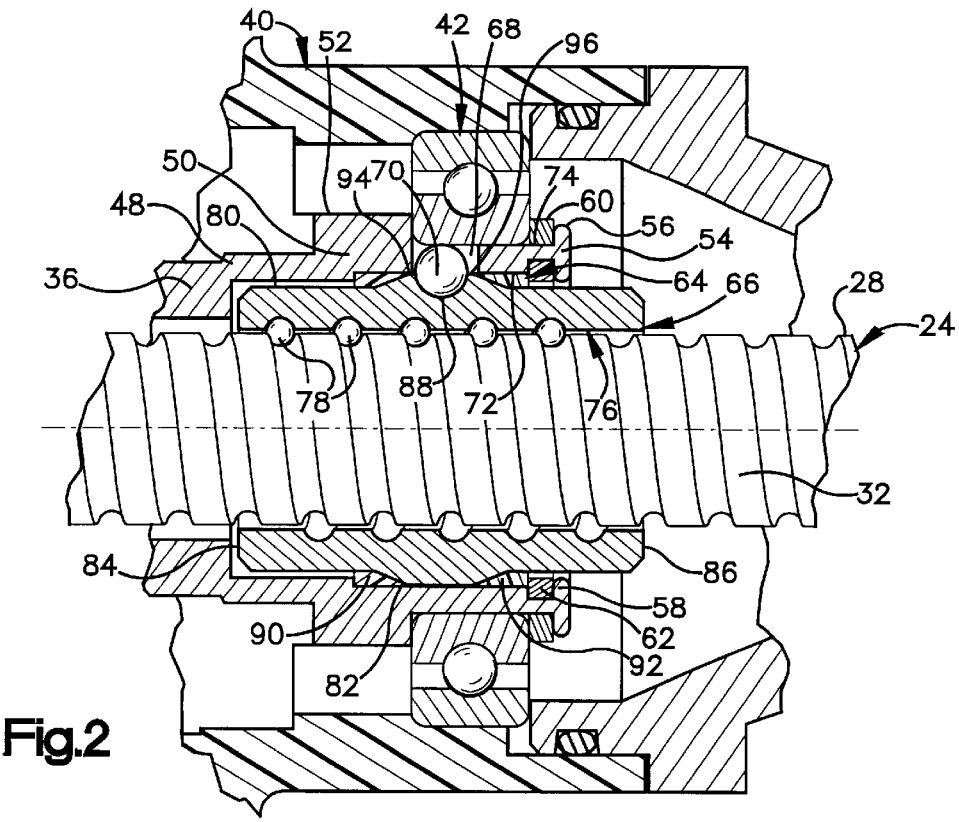
FIG. 2 is a detailed view of a portion of FIG. 1.

After extending axially on the side of the electric motor 38 opposite the pinion gear 14, the motor shaft 36 has a first radial extension 48 (FIG. 2). After the first radial extension 48, the motor shaft 36 extends axially for a short distance before again extending radially outwardly to form a second radial extension 50. An outer surface of the second radial extension forms a radially outwardly extending protrusion 52 for supporting a rotary bearing 42. After the second radial extension 50, the motor shaft 36 again extends in an axial direction. The motor shaft 36 continues to extend in an axial direction until ending at a roll edge 54.

The roll edge 54 is a portion of the motor shaft 36 that is split and formed into a radially outwardly extending lip 56 and a radially inwardly extending lip 58. The radially outwardly extending lip 56 secures a retaining ring 60 for securing a rotary bearing 42 against the protrusion 52. The radially inwardly extending lip 58 secures a retaining washer 62 for securing a swivel bearing 64 between the motor shaft 36 and a ballnut 66.

The motor shaft 36 has a opening 68 located in the axial extension between the second radial extension 50 and the roll edge 54. The opening 68 may be either square or round and is sized slightly larger than the diameter of a pivot ball 70. The opening 68 extends from an interior surface 72 of the motor shaft 36 to the exterior surface 74 of the motor shaft 36. A rotary bearing 42, when secured by the retainer ring 60 and the roll edge 54, covers the opening 68 on the exterior surface 74 of the motor shaft 36.

As shown in FIG. 2, a ballnut 66 is pivotally connected to and coaxial with the motor shaft 36. The ballnut 66 surrounds and engages the threaded portion 32 of the steering member 24. The ballnut 66 is rotatable relative to the steering member 24 and causes the steering member 24 to move linearly.

The ballnut 66 has a threaded cylindrical inner surface 76 and a plurality of drive balls 78 for engaging the threaded portion 32 of the steering member 24. The drive balls 78 are driven by the threaded cylindrical inner surface 76 of the ballnut 66. The ballnut 66 has a recirculation channel (not shown) for the drive balls 78, as is well known. The outer surface 80 of the ballnut 66 has a radially extending crown 82 and two ends 84 and 86. The two ends 84 and 86 are located on opposite sides of the crown 82. The crown 82 illustrated in FIG. 2 is machined onto the outer surface 80 of the ballnut 66 and the ballnut 66, less the drive balls 78, is formed as one-piece. The crown 82 of the outer surface 80 of the ballnut 66 has a circular recess 88 or dimple. The recess 88 is centrally located on the crown 82 of the ballnut 66 and is sized and shaped to engage a portion of a pivot ball 70.

The pivot ball 70 pivotally attaches the ballnut 66 to the motor shaft 36. A portion of the pivot ball 70 extends into the recess 88 formed in the crown 82 of the ballnut 66 and a portion of the pivot ball 70 is secured in the opening 68 of the motor shaft 36. As the motor shaft 36 rotates, the pivot ball 70 drives the ballnut 66 about the axis. The pivot ball 70 also allows the ballnut 66 to pivot relative the motor shaft 36 in all directions transverse to the axis. Since the pivot point of the ballnut 66 is the center of the pivot ball 70, when the ballnut 66 is pivoted, the ends 84 and 86 of the ballnut 66 move in a direction transverse to the axis. Thus, each end 84 and 86 of the ballnut 66 can pivot in any direction transverse to the axis.

A swivel bearing 64, preferably a nylon bearing, is located between the motor shaft 36 and the ballnut 66. The swivel bearing 64 reduces friction between the ballnut 66 and the motor shaft 36 during the movement of the ballnut 66 relative to the motor shaft 36. The swivel bearing 64 includes a first race 90 and a second race 92. An outer surface of the first race 90 fits into a cylindrical lip formed on the interior surface 72 of the motor shaft 36 by the second radial extension 50. The first race 90 is cylindrical and extends completely around the exterior surface of the crown 82 of the ballnut 66. An interior surface of the first race 90 is sized and shaped to support half of the crown 82 of the ballnut 66. The first race 90 extends axially from the cylindrical lip to the center of the crown 82 of the ballnut 66. In the location of the pivot ball 70, a semi-circular opening 94 is formed in the first race 90 of the swivel bearing 64 to allow passage of the pivot ball 70 between the motor shaft 36 and the ballnut 66. The second race 92 of the swivel bearing 64 is a mirror image of the first race 90. The second race 92 supports the other half of the crown 82 of the ballnut 66. When assembled, the semi-circular opening 94 in the first race is aligned with the semi-circular opening 96 in the second race 92 to form a circular opening through the swivel bearing 64. The pivot ball 70 passes through this opening.

As stated above, when the steering wheel 12 of the vehicle is rotated, the input shaft 16 attempts to rotate the pinion gear 14. If the resistance to rotation of the pinion gear 14 is low, the pinion gear 14 rotates and moves the steering member 24 in an axial direction. If the resistance to rotation of the pinion gear 14 is sufficient to cause the torsion bar 18 to deflect, the sensor 19 senses the direction and amount of deflection of the torsion bar 18 and actuates the electric motor 38. When actuated, the electric motor 38 causes the motor shaft 36 to rotate about the axis. Rotation of the motor shaft 36 causes the ballnut 66 to rotate relative the steering member 24. During the rotation of the ballnut 66, the drive balls 78 of the ballnut 66 interact with the treaded portion 32 of the steering member 24 to cause the steering member 24 to move axially relative to the ballnut 66. The direction of rotation of the ballnut 66 determines the axial direction that the steering member 24 moves.

The pivot ball 70 connecting the ballnut 66 to the rotatable member 34 allows the ballnut 66 to pivot, or swivel, relative to the rotatable member 34 and traverse to the axis. The recess 88 in the crown 82 of the ballnut 66 pivots around the spherical pivot ball 70. This pivotal connection of the rotatable member 34 and the ballnut 66 simplifies assembly of the power assisted steering system 10 because the ballnut 66 will pivot to become properly aligned, thus eliminating the need for close manufacturing tolerances. Also, the pivotal connection of the rotatable member 34 and the ballnut 66 will reduce the friction associated with movement of the steering member 24 relative the ballnut 66. When the steering member 24 is moving axially, the ballnut 66 will pivot about the pivot ball 70 to find the position where the friction between the steering member 24 and the ballnut 66 is minimized. As environmental factors change, the ballnut 66 will pivot to find the position within the rotatable member 34 where the friction between the steering member 24 and the ballnut 66 is minimized.

Figure 3:
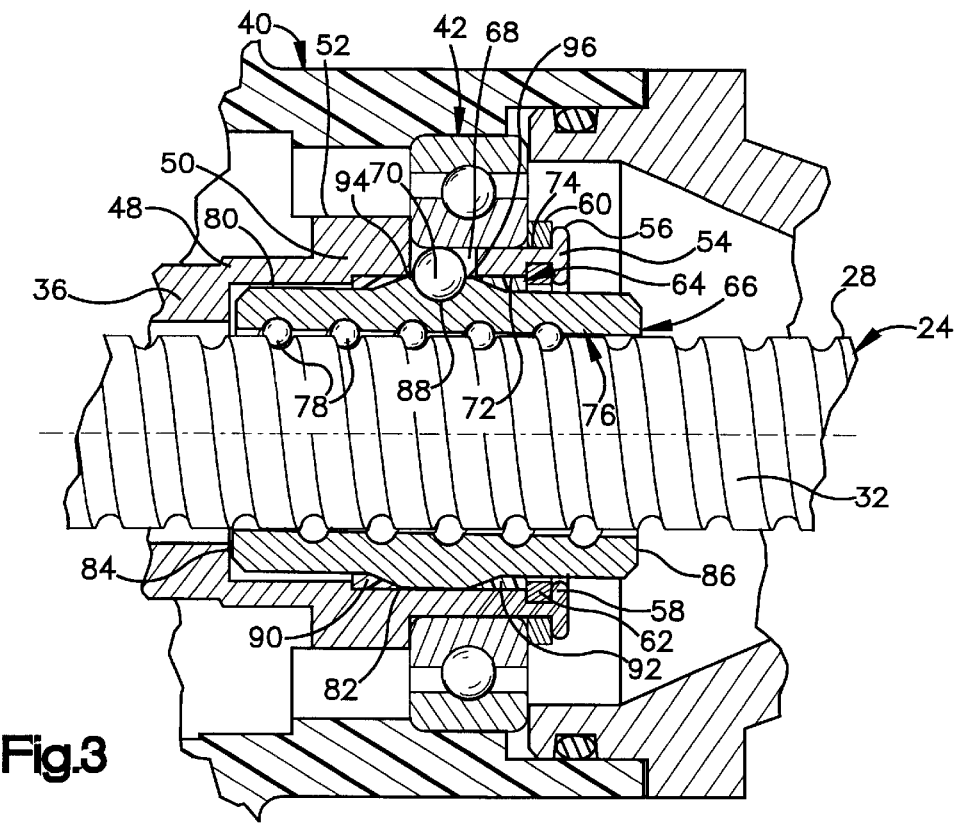
FIG. 3 is a view similar to FIG. 2 showing parts in a different position.

FIG. 3 shows the connection between the motor shaft 36 and the ballnut 66 when the ballnut 66 is in a pivoted position relative the motor shaft. In the pivoted position illustrated, end 84 of the ballnut 66 is shifted up, as shown in FIG. 3, and end 86 is shifted down. The amount of pivot in any given direction is limited by the spacing available between the ballnut 66 and the motor shaft 36. Although not illustrated, it should be understood that the ballnut 66 of FIG. 3 can also pivot so that ends 84 and 86 move in and out of the paper, i.e. perpendicular to the pivot position shown.

Figure 4:
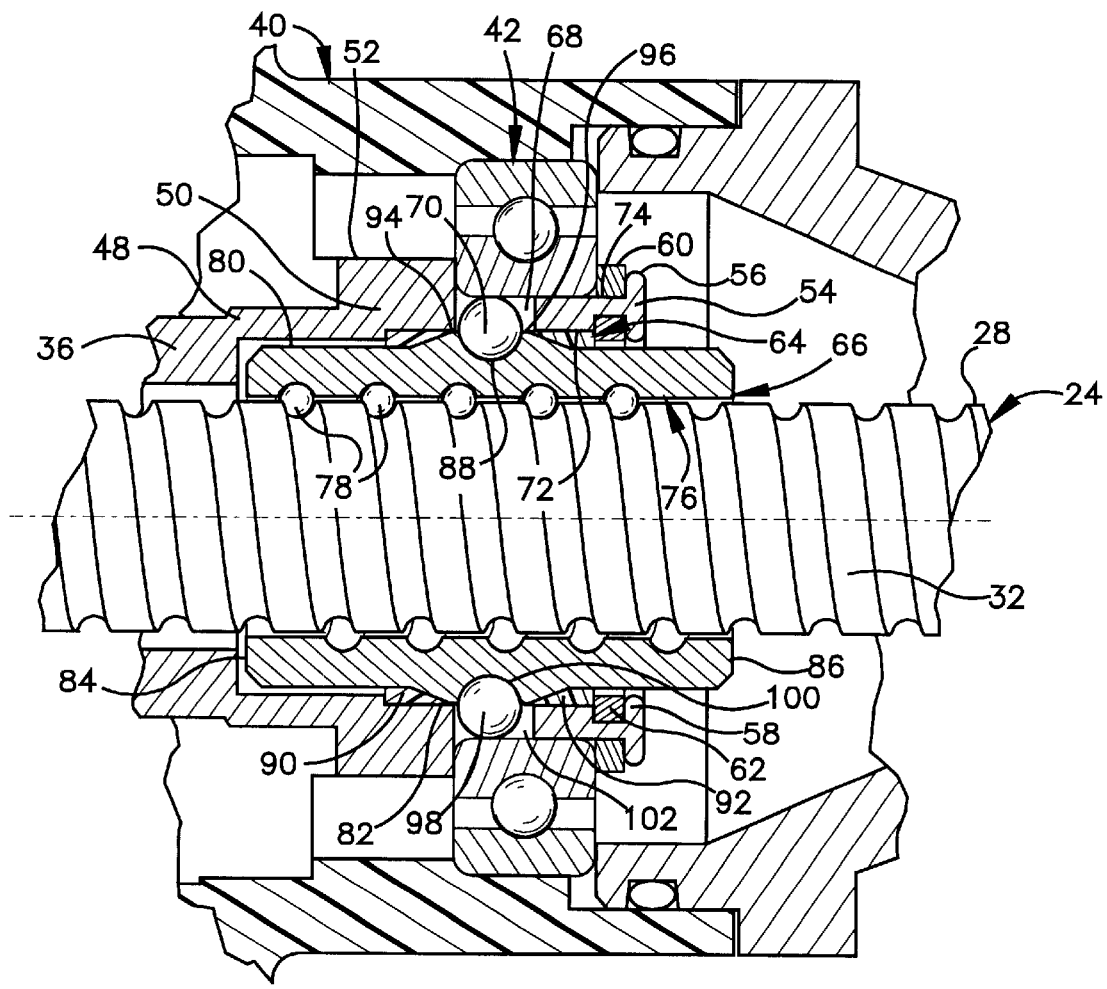
FIG. 4 is a view of a second embodiment of the invention.

FIG. 4 shows a second embodiment of the present invention. The power assisted steering system 10 shown in FIG. 4 is similar to the embodiment previously described with the exception that the second embodiment includes a second pivot ball 98. The second pivot ball 98 is located directly opposite the axis from the first pivot ball 70. The ballnut 66 has a second recess 100 located in the outer cylindrical surface of the crown 82 directly opposite the axis from the first recess 88. The motor shaft 36 also has a second opening 102 in a location corresponding to the location of the second recess 100 of the ballnut 66. A portion of the second pivot ball 98 extends into the second recess 100 of the ballnut 66 and a portion is secured in the second opening 102 of the motor shaft 36. The swivel bearing 64 has a second circular opening through which the second pivot ball 98 passes. The second pivot ball 98 forms a second pivotal attachment between the ballnut 66 and the motor shaft 36. Again the rotary bearing 42 closes the second opening 102 in the motor shaft 36 to secure the second pivot ball 98. A second pivot ball 98 is useful in applications when the load applied to the ballnut 66 is too great for one pivot ball to withstand.

Operation of the power assisted steering system 10 with two pivot balls is similar to a system 10 having one pivot ball with the exception that pivotal movement of the ballnut 66 relative the motor shaft 36 is more limited in the system 10 having two pivot balls and the pivot point of the ballnut 66 within the motor shaft 36 is in a different location in the system 10 having two pivot balls. The pivot point of the ballnut 66 in the system 10 having two pivot balls is moved to an intersection of an imaginary line between the centers of the two pivot balls 70 and 98 and the axis. When two pivot balls pivotally connect the rotatable member 34 and the ballnut 66, the ballnut 66 may still easily pivot in a direction perpendicular to the imaginary line connecting the centers of the two pivot balls 70 and 98, i.e., in and out of the paper as viewed in FIG. 4. However, pivoting of the ballnut 66 in a direction parallel to the imaginary line between the two pivot balls 70 and 98, i.e., up and down as viewed in FIG. 4, is limited because the crown 82 of the ballnut 66 is both axially and radially secured in the location of the two pivot balls 70 and 98. Some pivoting parallel to the imaginary line between the centers of the two pivot balls 70 and 98 will take place as the pivot balls 70 and 98 shift within the openings 68 and 102 of the motor shaft 36 and the corresponding recesses 88 and 100 of the ballnut 66. However, the amount of pivot will depend on the axial distance that each pivot ball 70 and 98 can shift within the respective opening and recess.

A third embodiment of the present invention is shown in FIG. 5. The third embodiment is similar to the first embodiment of the present invention. The following description of the third embodiment will discuss those aspects of the third embodiment which differ from the first embodiment. Aspects of the third embodiment not discussed will be similar in configuration to those in the first embodiment.

As shown in FIG. 5, the motor shaft 36 extends axially in a direction opposite the pinion gear 14 before turning radially outwardly to form a first radial extension 104. After extending radially a short distance, the motor shaft 36 again extends axially for a short distance before terminating at an annular end 106.

A cylindrical can 108 fixedly attaches to the exterior surface of the motor shaft 36 between the first radial extension 104 and the annular end 106. The cylindrical can 108 extends axially along the exterior surface of the motor shaft 36 until it reaches the annular end 106 of the motor shaft 36. At the annular end 106 of the motor shaft 36, the cylindrical can 108 extends radially inwardly to form a first lip 110. One side of the first lip 110 extends over a portion of the annular end 106 of the motor shaft 36 to secure the cylindrical can 108 to the motor shaft 36. The other side of the first lip 110 secures the first race 90 of the swivel bearing 64. The cylindrical can 108 also extends radially outwardly at a location near the annular end 106 of the motor shaft 36 to form a second lip 112. The cylindrical can 108 then extends axially from a location central to the second lip 112 before terminating at an annular end 114. The axial extension between the second lip 112 and the annular end 114 of the cylindrical can 108 has an opening 116 for the pivot ball 70. The opening 116 is either square or round and is sized slightly larger than the diameter of a pivot ball 70. The opening 116 extends from an interior surface 118 of the cylindrical can 108 to an exterior surface 120. A slot 122 is located on the exterior surface 120 of the cylindrical can 108 in a location between the opening 116 and the annular end 114 of the cylindrical can 108. The interior surface 118 of the cylindrical can 108, from a location opposite the slot 122 to the annular end 114 of the cylindrical can 108, is threaded.

A pair of rotary bearings 42 extends between the cylindrical can 108 and the housing 40. On a side nearest the electric motor 38, the second lip 112 of the cylindrical can 108 secures the inner race 44 of a rotary bearing 42. A lip 124 formed in the housing 40 secures the outer race 46. On a side opposite the electric motor 38, the inner race 44 of a rotary bearing is secured by a retainer ring 60 which is fitted into the slot 122 formed on the exterior surface 120 of the cylindrical can 108. A spacer 126 that extends between the outer race 46 and an outboard section 128 of the housing 40 secures the outer race 46 of the rotary bearing 42.

The ballnut 66 is pivotally connected to the cylindrical can 108 in the same manner as the ballnut 66 in the first embodiment is attached to the motor shaft 36. A rotary bearing 42 covers the exterior surface 120 of the opening 116 in the cylindrical can 108 and a swivel bearing 64 is located between the cylindrical can 108 and the ballnut 66. The first lip 110 formed by the radially inward extension of the cylindrical can 108 secures the first race 90 of the swivel bearing 64. A spanner nut 130 secures the second race 92 of the swivel bearing 64. The spanner nut 130 is cylindrical in shape and has a threaded outer surface. The threaded outer surface of the spanner nut 130 threads into a threaded portion 132 of the interior surface 118 of the cylindrical can 108 to secure the second race 92 of the swivel bearing 64.

As shown in FIG. 5, the ballnut 66 of the third embodiment is formed from two pieces. The main body 134 of the ballnut 66 has a threaded, cylindrical interior surface 136 for engaging the drive balls 78. The outer surface 138 of the main body 134 is formed by two axially extending cylindrical surfaces. A first axially extending cylindrical surface 140 has a diameter slightly larger than a second axially extending cylindrical surface 142. The two cylindrical surfaces 140 and 142 are connected by a short radial surface 144. The crown 146 has a cylindrical interior surface 148 and a curved outer surface 150. The interior surface 148 of the crown 146 is attached to the outer surface 138 of the main body 134 such that the interior surface 148 of the crown 146 engages the second axially extending cylindrical surface 142 and a side of the crown 146 engages the short radial surface 144. Preferably, the crown 146 is welded to the main body 134 of the ballnut 66.

Operation of the third embodiment of the power assisted steering system 10 is similar to operation of the first embodiment. Since the cylindrical can 108 is fixed to the motor shaft 36, the cylindrical can 108 is the rotatable member 34 that rotates the ballnut 66. Since the crown 146 of the ballnut 66 is fixed to the main body 134 of the ballnut 66, the two-piece ballnut operates in the same manner as the one-piece ballnut.

FIG. 6 shows a fourth embodiment of the present invention. The power assisted steering system 10 shown in FIG. 6 is similar to the third embodiment with the exception that the fourth embodiment includes a second pivot ball 98. The second pivot ball 98 is located directly opposite the axis from the first pivot ball 70. The crown 146 of the ballnut 66 has a second recess 152 located in the outer cylindrical surface of the crown 146 directly opposite the axis from the first recess. The cylindrical can 108 also has a second opening 154 in a location corresponding to the location of the second recess 152 of the ballnut 66. A portion of the second pivot ball 98 extends into the second recess 152 of the ballnut 66 and a portion is secured in the second opening 154 of the cylindrical can 108. The second pivot ball 98 forms a second pivotal attachment between the ballnut 66 and the cylindrical can 108. Again, a rotary bearing 42 closes the second opening 154 in the cylindrical can 108 to secure the second pivot ball 98 in place. The swivel bearing 64 has a second circular opening through which the second pivot ball 98 passes. A second pivot ball 98 is useful in applications when the load applied to the ballnut 66 is too great for one pivot ball to withstand.

Operation of the fourth embodiment of the power assisted steering system 10 is similar to that described with regard to the second embodiment with the exception that the rotatable member 34 in the fourth embodiment is the cylindrical can 108.

From the above description of the invention, those skilled in the art will perceive improvements, changes and modifications. Examples of such/changes or modifications include different configurations of the rotatable member 34 and different mounting techniques of the bearings 42 and 64. Also, it should be understood that the invention is applicable to systems which are other than steering systems such as industrial machines, or any system using a ballnut to move a member. Such improvements, changes and modifications within the skill of the art are intended to be covered by the appended claims.

Having described the invention, the following is claimed:

1. A power assisted steering system comprising:
    a rotatable member capable of rotating about an axis;
    a ballnut being coaxial with the rotatable member, the ballnut having a threaded cylindrical inner surface and a plurality of drive balls; and
    a steering member being coaxial with the rotatable member and the ballnut, the steering member having a threaded portion;
    the steering member extending through the inner surface of the ballnut such that the drive balls of the ballnut engage the threaded portion of the steering member;
    the ballnut being rotatably driven about the axis by the rotatable member and being pivotal relative to the rotatable member in a direction transverse to the axis.

2. The power assisted steering system as in claim 1 further being defined by:
    the rotatable member being a motor shaft and the ballnut being at least partially located within the motor shaft.

3. The power assisted steering system as in claim 1 further being defined by:
    the ballnut having an outer cylindrical surface with a recess;
    the rotatable member having an opening that corresponds with the recess of the ballnut; and
    a pivot ball being partially located in the recess of the ballnut and partially in the opening of the rotatable member to form a pivotal attachment between the ballnut and the rotatable member for pivoting the ballnut relative the rotatable member.

4. The power assisted steering system as in claim 3 further being defined by:
    the outer surface of the ballnut having a centrally located crown and two ends located on opposite axial sides of the crown, the ballnut recess being located in the crown such that when the ballnut is pivoted relative to the rotatable member each end of the ballnut may oscillate in a direction transverse to the axis.

5. The power assisted steering system as in claim 3 further being defined by:
    the rotatable member being located in a housing;
    a rotary bearing being located between the housing and an exterior surface of the rotatable member to allow the rotatable member to rotate relative the housing;
    the opening in the rotatable member extending from an interior surface of the rotatable member to the exterior surface of the rotatable member; and
    the rotary bearing covering the opening on the exterior surface of the rotatable member and securing the ball between the ballnut and the rotatable member.

6. The power assisted steering system as in claim 4 further being defined by:
    a swivel bearing being located between the rotatable member and the ballnut for reducing friction during relative movement of the ballnut.

7. The power assisted steering system as in claim 6 further being defined by;
    at least one retainer ring attaching to the rotatable member for retaining the swivel bearing between the rotatable member and the ballnut.

8. The power assisted steering system as in claim 3 further being defined by:
    the ballnut having a second recess located on the outer cylindrical surface in a location directly opposite the axis from the first recess;
    the rotatable member having a second opening located in a location corresponding with the second recess of the ballnut;
    a second pivot ball being partially located in the second recess of the ballnut and partially in the second opening of the rotatable member to form a second pivotal attachment between the ballnut and the rotatable member.

9. The power assisted steering system as in claim 8 further being defined by:
    the second opening in the rotatable member extending from an interior surface of the rotatable member to the exterior surface of the rotatable member; and
    the rotary bearing covering the second opening on the exterior surface of the rotatable member and securing the second pivot ball between the ballnut and the rotatable member.

10. The power assisted steering system as in claim 1 further being defined by:

the rotatable member being rotatable by an electric motor.

11. A system comprising:

a rotatable member capable of rotating about an axis;

a ballnut being coaxial with the rotatable member, the ballnut having a threaded cylindrical inner surface and a plurality of drive balls; and a movable member being coaxial with the rotatable member and the ballnut, the movable member having a threaded portion;

the movable member extending through the inner surface of the ballnut such that the drive balls of the ballnut engage the threaded portion of the movable member;

the ballnut being rotatably driven about the axis by the rotatable member and being pivotal relative to the rotatable member in a direction transverse to the axis.

12. The system as in claim 11 further being defined by:

the rotatable member being a motor shaft and the ballnut being at least partially located within the motor shaft.

13. The system as in claim 11 further being defined by:

the ballnut having an outer cylindrical surface with a recess;

the rotatable member having an opening that corresponds with the recess of the ballnut; and a pivot ball being partially located in the recess of the ballnut and partially in the opening of the rotatable member to form a pivotal attachment between the ballnut and the rotatable member for pivoting the ballnut relative the rotatable member.

14. The system as in claim 13 further being defined by:

the outer surface of the ballnut having a centrally located crown and two ends located on opposite axial sides of the crown, the ballnut recess being located in the crown such that when the ballnut is pivoted relative to the rotatable member each end of the ballnut may oscillate in a direction transverse to the axis.

15. The system as in claim 13 further being defined by:

the rotatable member being located in a housing;

a rotary bearing being located between the housing and an exterior surface of the rotatable member to allow the rotatable member to rotate relative the housing;

the opening in the rotatable member extending from an interior surface of the rotatable member to the exterior surface of the rotatable member; and the rotary bearing covering the opening on the exterior surface of the rotatable member and securing the ball between the ballnut and the rotatable member.

16. The system as in claim 14 further being defined by:

a swivel bearing being located between the rotatable member and the ballnut for reducing friction during relative movement of the ballnut and the movable member.

17. The system as in claim 16 further being defined by:

at least one retainer ring attaching to the rotatable member for retaining the swivel bearing between the rotatable member and the ballnut.

18. The system as in claim 13 further being defined by:

the ballnut having a second recess located on the outer cylindrical surface in a location directly opposite the axis from the first recess;

the rotatable member having a second opening located in a location corresponding with the second recess of the ballnut;

a second pivot ball being partially located in the second recess of the ballnut and partially in the second opening of the rotatable member to form a second pivotal attachment between the ballnut and the rotatable member.

* * * * *